United States Patent [19]

Van Duyn et al.

[11] Patent Number: 4,947,294

[45] Date of Patent: Aug. 7, 1990

[54] HEADLAMP ASSEMBLY

[75] Inventors: Paul D. Van Duyn; Robert C. House, II; Leslie H. Hallgarth, all of Anderson, Ind.

[73] Assignee: General Motors Corporation, Detorit, Mich.

[21] Appl. No.: 430,831

[22] Filed: Oct. 10, 1989

Related U.S. Application Data

[63] Continuation of Ser. No. 342,211, Apr. 24, 1989, abandoned.

[51] Int. Cl.[5] ..................... B60Q 1/00

[52] U.S. Cl. ..................... 362/61; 362/306; 313/318

[58] Field of Search ..................... 362/61, 226, 80, 83, 362/267, 306; 313/318

[56] References Cited

U.S. PATENT DOCUMENTS

| | | | |
|---|---|---|---|
| 4,682,274 | 7/1987 | Freudenreich et al. | 362/61 |
| 4,774,645 | 9/1988 | Iwamoto | 362/226 |
| 4,794,500 | 12/1988 | Bradley | 362/226 |
| 4,819,142 | 4/1989 | Lothamer et al. | 362/226 |
| 4,822,302 | 4/1989 | Doreans | 439/544 |
| 4,829,408 | 5/1989 | Haydu | 362/61 |

*Primary Examiner*—Ira S. Lazarus
*Assistant Examiner*—Richard R. Cole
*Attorney, Agent, or Firm*—Edward J. Biskup

[57] ABSTRACT

A vehicle headlamp having a retainer that can be fastened to the rear of the reflector through sonic welding or by adhesive bonding and that includes a pair of integrally interconnected ring members which provide a circular open space therebetween for accommodating the retainer members formed on a replaceable light bulb and has locator tabs formed on one of the ring members for cooperation with locator slots on the reflector for properly locating the retainer on the reflector.

4 Claims, 2 Drawing Sheets

HEADLAMP ASSEMBLY

This is a continuation of application Ser. No. 342,211 filed on Apr. 24, 1989, now abandoned.

This invention concerns headlamps and more particularly relates to a vehicle headlamp having a retainer arrangement for maintaining a replacement light bulb within a socket formed in the rear of a headlamp reflector.

More specifically, the vehicle headlamp according to the present invention includes a plastic reflector the rear portion of which has a circular socket surrounded by an axially outwardly projecting annular flange concentrically located relative to the socket. A plastic retainer is bonded to the rear portion of the reflector for supporting a replacement light bulb and serves to locate the light bulb in a predetermined position relative to the reflecting surface of the reflector. In the preferred form, the retainer includes in inner ring member and outer ring member integrally interconnected by a plurality of circumferentially spaced ribs so as to form a circular open space for receiving a light bulb. The outer ring member is formed with a plurality of access slots for receiving the retainer members formed on the light bulb, after which the latter is rotated so that the retainer members move into the open space between the inner and outer ring members and assume a locked position relative to the retainer. The inner ring member has means formed thereon which cooperate with the annular flange for rotationally positioning the retainer relative to the socket in the reflector as well as prepositioning the retainer along an X-axis and a Y-axis.

The following patents and patent application show headlamp assemblies which include retainers that have certain structural similarities to the present invention.

U.S. Pat. No. 4,760,507 Mochizuki et al issued July 26, 1988

U.S. Pat. No. 4,384,319 Blaisdell et al issued May 17, 1983

U.S. Pat. No. 4,794,500 Bradley issued Dec. 27, 1988

U.S. Pat. No. 4,747,029 Liverance et al issued May 24, 1988

U.S. Ser. No. 231,023 Haydu filed Aug. 11, 1988

The objects of the present invention are to provide a new and improved vehicle headlamp provided with a retainer for a replaceable light bulb that is bonded to the rear of the reflector and is formed by a pair of axially spaced and integrally interconnected ring members one of which has access slots for receiving the retainer members on the light bulb; to provide a new and improved vehicle headlamp in which a plastic reflector has an axially projecting annular flange formed integrally on the rear end of the reflector and serves to rotationally and axially locate for bonding unto the reflector a dual ring type retainer for a replacement light bulb; to provide a new and improved vehicle headlamp having a retainer that can be fastened to the rear of a reflector through sonic welding or by adhesive bonding and that includes a pair of integrally interconnected ring members which provide a circular open space for accommodating the retainer members formed on a replacement light bulb and has locator tabs formed on one of the ring members for cooperation with locator slots on the reflector for properly locating the retainer on the reflector; and to provide a new and improved vehicle headlamp which includes a plastic single piece retainer that receives and supports a replaceable light bulb in a predetermined position relative to the reflecting surface of the reflector and that is formed by an inner ring member and an outer ring member one of which has a major diameter dimension equal to the minor diameter dimension of the other ring member.

Other objects and advantages of the present invention will be apparent from the following detailed description when taken with the drawings in which FIG. 1 is a plan view showing a partial vehicle headlamp incorporating a retainer and replacement light bulb according to the present invention;

Figure 1:
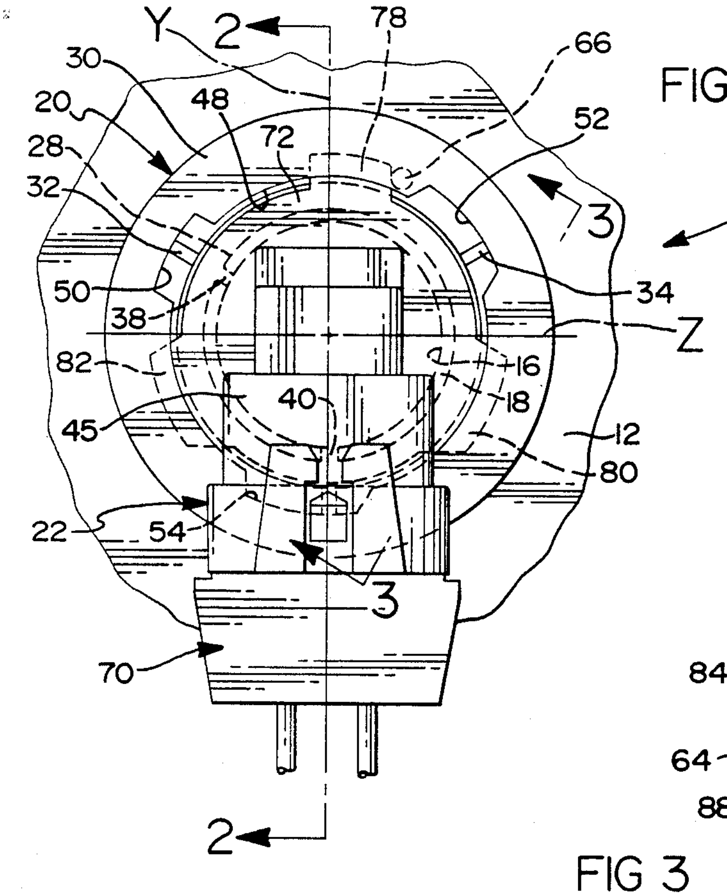
Figure 2:
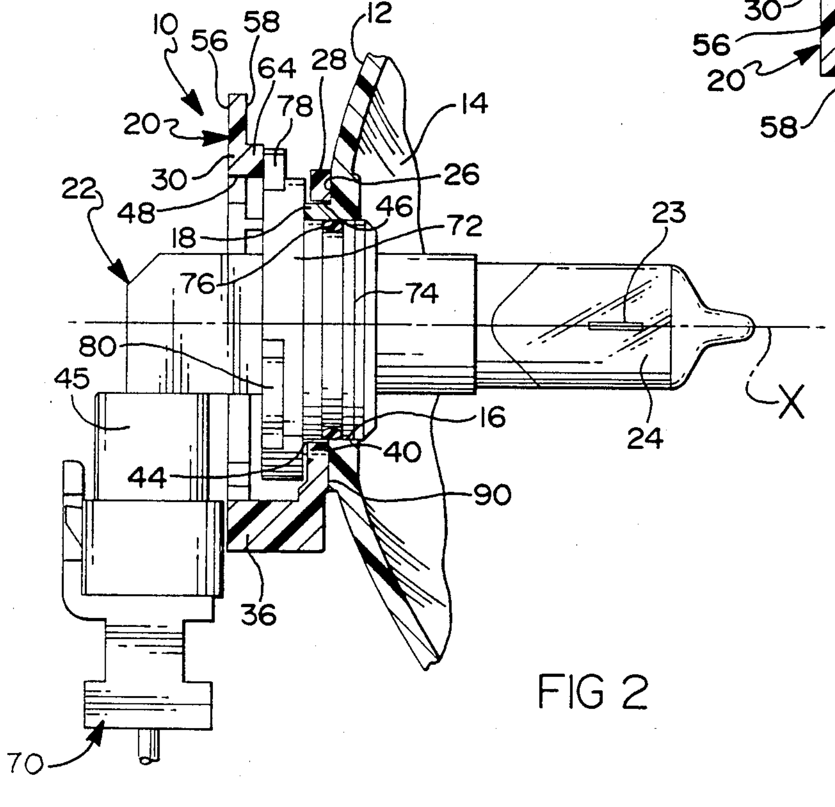
FIG. 2 is a side elevational view taken on line 2—2 of FIG. 1.

Referring now to the drawings and more particularly FIG. 1 thereof, a vehicle headlamp 10 made in accordance with the present invention is shown having the usual reflector 12 which is only partially shown. The reflector 12 is made of plastic and provided with a cavity having an aluminized parabolic reflecting surface 14. As seen in FIG. 2, the rear of the reflector 12 is formed with a circular opening or socket 16 surrounding by an annular flange 18 which projects axially rearwardly from and is integral with the body of the reflector 12.

A retainer 20 is bonded to the rear of the reflector 12 and serves to support a replacement light bulb assembly 22 and is located on the reflector 12 in a manner so as to assure that the filament 23 of the light bulb 24 is positioned in a predetermined position relative to the reflecting surface 14 of the associated reflector 12.

As aforementioned, the socket 16 is surrounded by an annular flange 18 which is integrally formed with the reflector 12. As will be hereinafter explained more fully, the outer peripheral surface of the annular flange 18 serves to properly locate the retainer 20 along a Y-axis and a Z-axis while a flat annular seating surface 26 on the reflector 12 serves to locate the retainer 20 along an X-axis.

Figure 3:
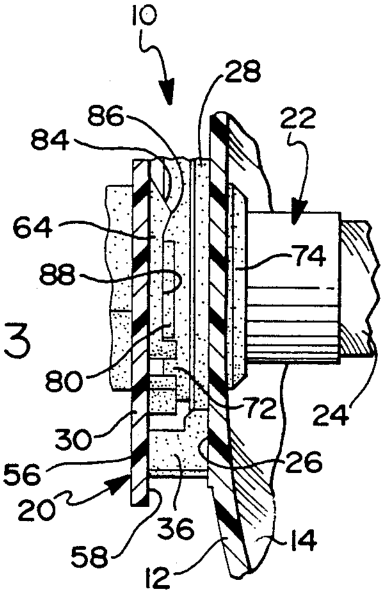
FIG. 3 is a sectional view taken on line 3—3 of FIG. 1.
Figure 4:
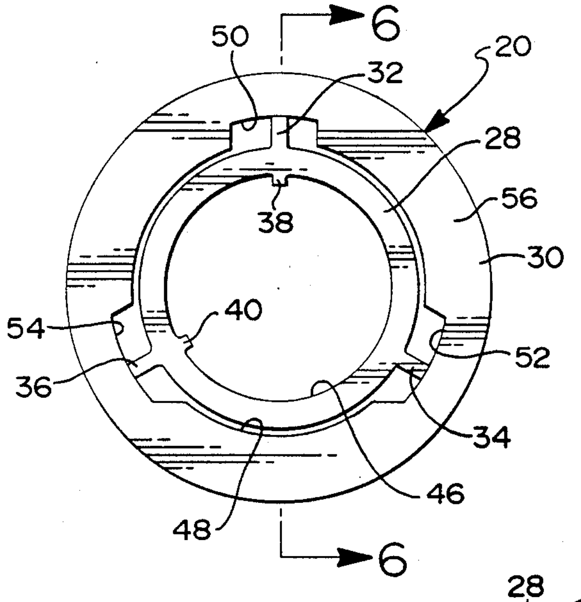
FIG. 4 is a frontal view of the retainer seen in FIGS. 1-3 when separated from the headlamp and with the replacement light bulb removed.
Figure 5:
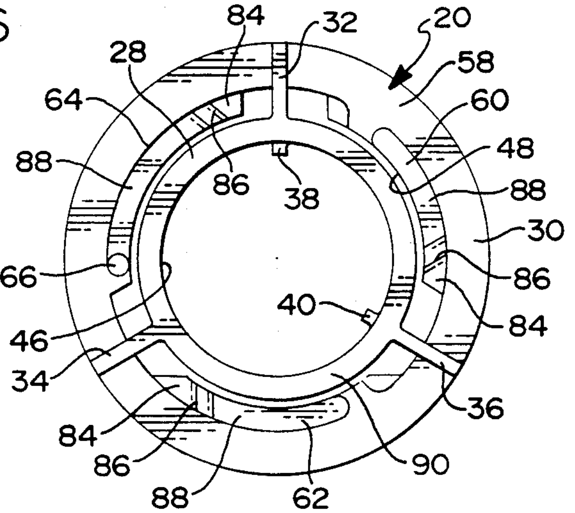
FIG. 5 is a rear view of the retainer seen in FIG. 4.
Figure 6:
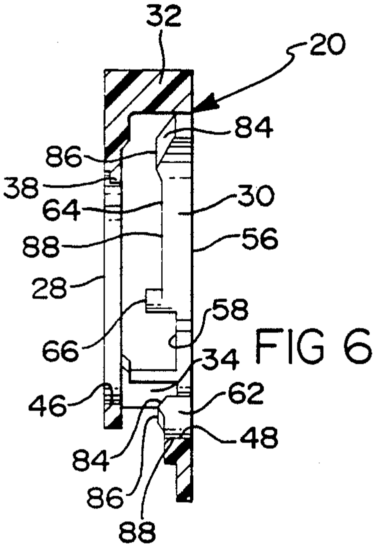
FIG. 6 is a sectional view taken on line 6—6 of FIG. 4.

Referring now to FIGS. 2-6, the retainer 20 is made of plastic and includes an inner ring member 28 and an outer ring member 30 integrally interconnected by three circumferentially equally spaced and axially oriented ribs 32, 34 and 36. The ring members 28 and 30 form a unitary member having a ring-like or circular open space therebetween for supporting the light bulb assembly 22. More specifically, the inner ring member 28, as seen in FIGS. 4 and 5, has two radially inwardly extending locator tabs 38 and 40 formed thereon which serve to locate the retainer 20 rotationally on the annular flange 18 formed on the reflector 12. In this regard, it will be noted that the locator tabs 38 and 40 are spaced from each other approximately 120° and the annular flange 18 is formed with a pair of annularly spaced locator slots 42 and 44 which are similarly spaced from each other approximately 120°. Depending upon where it is a desire to position the 90° angled connector portion 45 light bulb assembly 22 rotationally with respect to the reflector 12 will determine where the slots 42 and 44 are located on the flange 18. It will also be noted that the circular opening 46 in the inner ring member 28 has a diameter essentially equal to the outer diameter of the annular flange 18 on the reflector 12.

Figure 7:
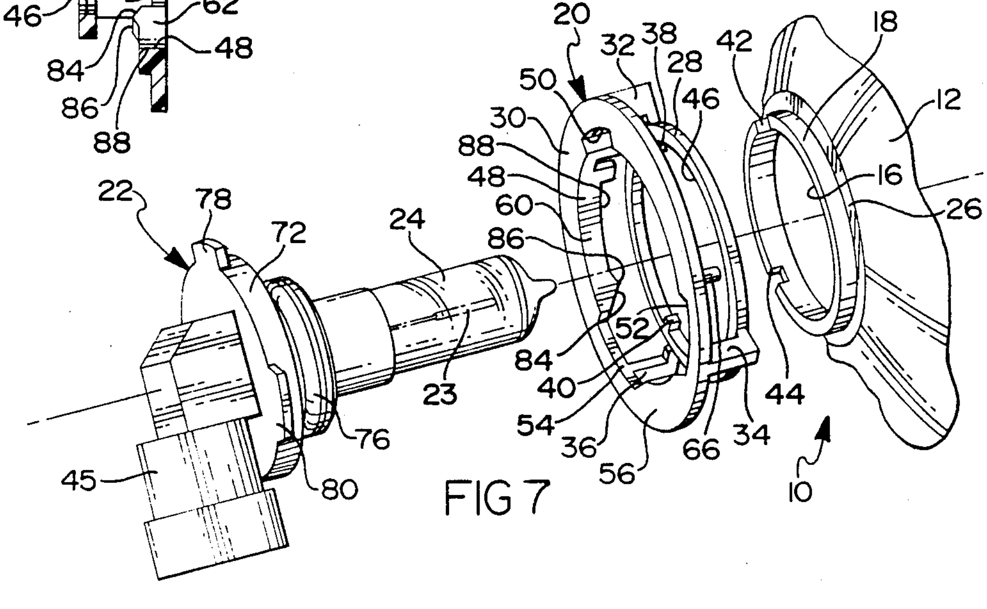
FIG. 7 is an exploded view showing the various parts of the headlamp assembly according to the present invention.

As seen in FIG. 4, the outer ring member 30 is formed with a central circular opening 48 surrounded by three radially extending access slots 50, 52, 54. As seen in FIGS. 4, 5, and 7, the outer surface 56 of the outer ring member 30 is planar and flat while the inner surface 58 is integrally formed with three identical curved ramp portions 60, 62, 64 each of which starts at one access slot and terminates at the adjacent access slot. The portion of the outer ring member 30 on which each ramp portion 60, 62, 64 is formed and extends between adjacent ribs serves as a spring section. In addition, an inwardly projecting stop member 66 in the form of a cylindrical pin is formed on the inner surface 58 of the outer ring member 30.

The central opening 48 in the outer ring member 30 is adapted to receive the light bulb assembly 22, and in this regard, it will be noted that, as seen in FIGS. 1 and 2 and 3, the light bulb assembly 22 includes a body portion made of an insulating material such as plastic that receives the light bulb 24. The body portion of the light bulb assembly 22 includes the 90° angled connector portion 45 that electrically connects to the plug end of the wiring harness 70 of a motor vehicle. The body portion is also formed with an integral collar 72 having an outer diameter larger than the diameter of the opening 46 formed in the inner ring member 28 and slightly smaller than the opening 48 of the outer ring member 30. A neck portion 74 is integrally formed with the collar 72 and carries an O-ring 76 which assures a snug sealed fit is provided in the opening 16 of the reflector 12 when the light bulb assembly 22 is located in the retainer 20 as seen in FIGS. 1, 2 and 3. It will also be noted that the collar 72 is integrally formed with three radially outwardly extending and circumferentially spaced retainer members 78, 80, and 82 which are adapted to be received by the access slots 50, 52, and 54 respectively, formed in the outer ring member 30 of the retainer 20. In this regard, it will be noted that the access slots 52 and 54 are identical in size and configuration while the access slot 50 is smaller in size that the slots 52 and 54. Similarly, the retainer members have the general configuration and size of access slots 80 and 82 while retainer member 78 is designed to be received only by access slot 50. This retainer member and access slot design assures the light bulb assembly 22 is properly located within the opening 46 of the retainer 20 when manually inserted therein.

Thus, as seen in FIG. 1, when the light bulb assembly 22 is inserted into the opening 46, the retainer members 78–82 are aligned with and located within the access slots 50–54 and afterwards the body portion of the light bulb assembly 22 is rotated clockwise causing each retainer member 78–82 to initially contact the tapered portion (such as portion 84 of ramp portion 64 seen in FIG. 6) of the associated ramp portion causing that portion of the outer ring member 30 fo flex rearwardly. As the body portion continues to be rotated in a clockwise direction, each retainer member 78–82 will move over the apex 86 of the associated ramp portion and enter the raised flat section 88 of the ramp portion causing the portion of the ring member 30 between adjacent ribs to act as a spring and cause the section 88 to press the associated retainer member on the light bulb assembly 22 and accordingly the collar 72 thereof into firm contact with the flange 18. The body portion of the light bulb assembly 22 will be restrained from further clockwise rotation when the retainer member 78 contacts the stop member 66 as seen in FIG. 1. The light bulb assembly 22 will then assume the position shown in FIGS. 1–3 at which point the light bulb assembly 22 is prevented from further clockwise movement by the stop member 66 and proper orientation of the light bulb 24 along the X, Y and Z axes relative to the reflecting surface is attained.

Referring again to the inner ring member 30 and particularly to FIG. 7, it will be noted that during assembly the locator tabs 38 and 40 project radially inwardly therefrom and cooperate with the locator slots 42 and 44, respectively for proper locating the retainer 20 rotationally relative to the reflector 12. Also, as seen in FIGS. 2 and 5, the planar surface 90 of the inner ring member 28 abuts the annular seating surface 26 around the flange 18 for prepositioning the retainer along an X-axis. Inasmuch as the diameter of the opening 46 of the inner ring member 28 is the same as the outer diameter of the annular flange 18 as explained hereinbefore, it should be apparent that the retainer 20 when located on the flange 18 will be properly positioned relative to the reflector 12 along the Y-axis and Z-axis. Once the retainer 20 is located on the reflector 12 as seen in FIGS. 1–3, the inner ring member 28 can be sonically welded to the seating surface 26 on the reflector 12 or, in the alternative, an adhesive such as an epoxy resin can be used to bond the two members together.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In combination, a vehicle headlamp assembly including a plastic reflector formed with a parabolic reflecting surface and a circular socket formed in said reflecting surface and adapted to receive a light bulb of a replacement light bulb assembly from the rear of said reflector, an annular flange integrally formed with and projecting axially outwardly from the rear end of said reflector and concentrically surrounding said socket, an annular seating surface lying in a plane substantially perpendicular to the axis of said socket surrounding said flange, a plastic retainer located at the rear of said reflector and forming a permanent part thereof for positioning said light bulb assembly in a predetermined position relative to said opening, and a replaceable light bulb assembly having a lamp smaller in diameter than said opening and having three circumferentially spaced retainer members projecting radially outwardly therefrom, said retainer including an inner ring member and an outer ring member spaced axially from each other in parallel planes and being integrally interconnected by circumferentially spaced ribs so as to define an open circular space with an axial dimension sufficient to accommodate said retainer members on said light bulb assembly, the major diameter of said outer ring member being larger than the major diameter of said inner ring member, said outer ring member having three access slots formed therein for selectively receiving said three retainer members of said replaceable bulb assembly and having a stop formed thereon, said inner ring member surrounding said flange and being bonded to said seating surface at the rear end of said reflector and having a tab means projecting radially inwardly from said inner ring member and cooperating with slot means in said annular flange for rotationally orientating said inner ring member relative to said socket, said access slots upon receiving said retainer members of said light bulb assembly permitting said retainer members to move into said open space between the ring members from the rear thereof after which said light bulb assembly is rotated into engagement with said stop to orient said light bulb assembly rotationally with respect to said reflector, and ramp portions serving as press means formed on said outer ring member for continually engaging and pressing said retainer members inwardly towards said socket when said light bulb assembly is rotated so as to orient said light bulb axially with respect to said reflector.

2. In combination, a vehicle headlamp assembly including a reflector formed with a parabolic reflecting surface and a circular socket formed in said reflecting surface and adapted to receive a light bulb of a replacement light bulb assembly from the rear of said reflector, an annular flange integrally formed with and projecting axially outwardly from the rear end of said reflector and concentrically surrounding said socket, a retainer located at the rear of said reflector and forming a permanent part thereof for positioning said light bulb assembly in a predetermined position relative to said reflecting surface, and a relacement light bulb assembly having a lamp bulb smaller in diameter than said opening and having three circumferentially spaced retainer members projecting radially outwardly therefrom, said retainer including an inner ring member and an outer ring member spaced axially from each other and being interconnected by a plurality of circumferentially spaced ribs so as to define a open circular space between the ring members with an axial dimension sufficient to accommodate said retainer members on said light bulb assembly, said outer ring member having three access slots formed therein for selectively receiving said three retainer members of said replacement bulb assembly and having a stop formed thereon, said inner ring member surrounding said flange and being bonded to said rear end of said reflector and having means cooperating with said annular flange for rotationally orientating said inner ring member relative to said socket, said access slot upon receiving said retainer members of said light bulb assembly permitting said retainer members to move into said open space of said retainer from the rear of said reflector after which said light bulb assembly is rotated into engagement with said stop to orient said light bulb assembly rotationally with respect to said reflector, and ramp portions serving as press means formed on said outer ring member for continually engaging and pressing said retainer members inwardly towards said socket when said light bulb assembly is rotated so as to orient said light bulb axially with respect to said reflector.

3. In combination, a vehicle headlamp assembly including a relfector formed with a parabolic reflecting surface and a circular socket formed in said reflecting surface and adapted to receive a light bulb of a replacement light bulb assembly from the rear of said reflector, an annular flange integrally formed with and projecting axially outwardly from the rear end of said reflector and concentrically surrounding said socket, a retainer located at the rear of said reflector and forming a permanent part thereof for positioning said light bulb assembly in a predetermined position relative to said reflecting surface, and a replacement light bulb assembly having a lamp bulb smaller in diameter than said opening and having three circumferentially spaced retainer members projecting radially outwardly therefrom, said retainer including an inner ring member and an outer ring member spaced axially from each other and being interconnected by a plurality of circumferentially spaced ribs so as to define an open circular space between said ring members with an axial dimension sufficient to accommodate said retainer members on said light bulb assembly, said outer ring member having three access slots formed therein for selectively receiving said three retainer members of said replacement bulb assembly and having a stop formed thereon, a planar seating surface surrounding said flange, means for bonding said inner ring member to said seating surface at the rear end of said reflector, means formed on said inner ring member cooperating with said annular flange for rotationally orientating said inner ring member relative to said socket, said access slots upon receiving said retainer members of said light bulb assembly permitting said retainer members to move into said open space between the ring members from the rear thereof after which said light bulb assembly is rotated into engagement with said stops to orient said light bulb assembly rotationally with respect to said reflector, and ramp portions serving as press means formed on said outer ring member for continually engaging and pressing said retainer members inwardly towards said socket when said light bulb assembly is rotated so as to orient said light bulb axially with respect to said reflector.

4. In combination, a vehicle headlamp assembly including a plastic reflector formed with a parabolic reflecting surface and a circular socket formed in said reflecting surface and adapted to receive a light bulb of a replacement light bulb assembly from the rear of said reflector, an annular flange integrally formed with and projecting axially outwardly from the rear end of said reflector and concentrically surrounding said socket, an annular seating surface lying in a plane substantially perpendicular to the axis of said socket surrounding said flange, a plastic retainer located at the rear of said reflector and forming a permanent part thereof for positioning said light bulb assembly in a predetermined position relative to said opening, and a replaceable light bulb assembly having a lamp bulb smaller in diameter than said opening and having three circumferentially spaced retainer members projecting radially outwardly therefrom, said retainer including an inner ring member and an outer ring member spaced axially from each other and being integrally interconnected by three circumferentially spaced ribs so as to define an open circular space with an axial dimension sufficient to accommodate said retainer members on said light assembly, the major diameter of said outer ring member being larger than the major diameter of said inner ring member, said outer ring member having three access slots formed therein for selectively receiving said three retainer members of said replaceable bulb assembly and having a stop formed thereon, said inner ring member surrounding said flange and being bonded to said seating surface at the rear end of said reflector and having a pair of tabs cooperating with a pair of slots in said annular flange for rotationally orientating said inner ring member relative to said socket, said access slots upon receiving said retainer members of said light bulb assembly permitting said retainer members to move into said open space between the ring members from the rear thereof after which said light bulb assembly is rotated into engagement with said stop to orient said light bulb assembly rotationally with respect to said reflector, and ramp portions serving as press means formed on said outer ring member for continually engaging and pressing said retainer members inwardly towards said socket when said light bulb assembly is rotated so as to orient said light bulb axially with respect to said reflector.

* * * * *